2 Sheets—Sheet 1.
J. E. SMITH.
GRAIN-SEPARATOR.
No. 192,941. Patented July 10, 1877.
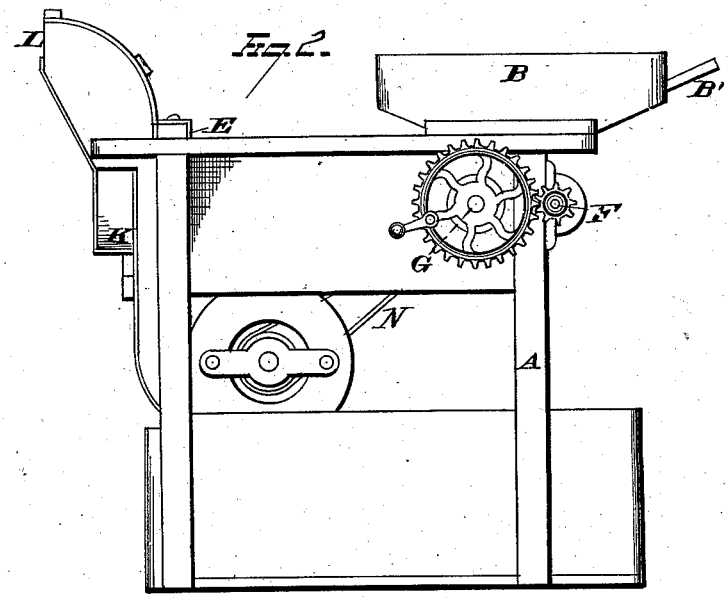
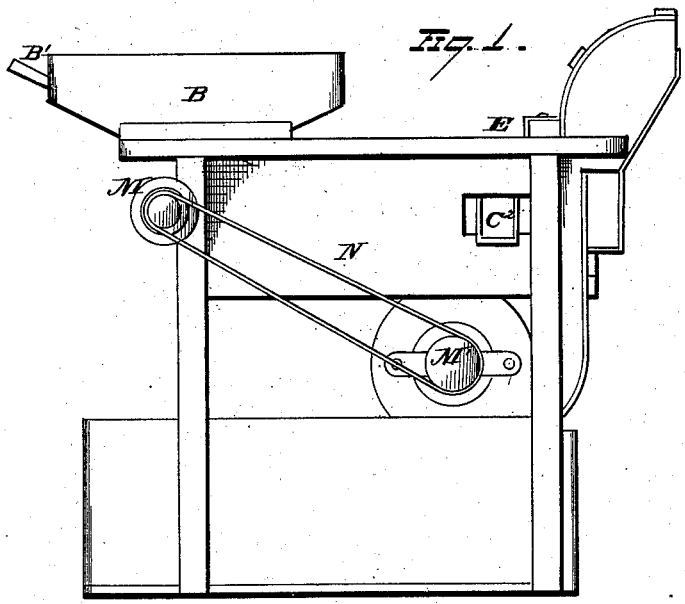
WITNESSES
Ed. I. Nottingham
A. W. Bright
INVENTOR
John E. Smith
By Leggett & Leggett
ATTORNEY 2 Sheets—Sheet 2.
J. E. SMITH.
GRAIN-SEPARATOR.
No. 192,941. Patented July 10, 1877.
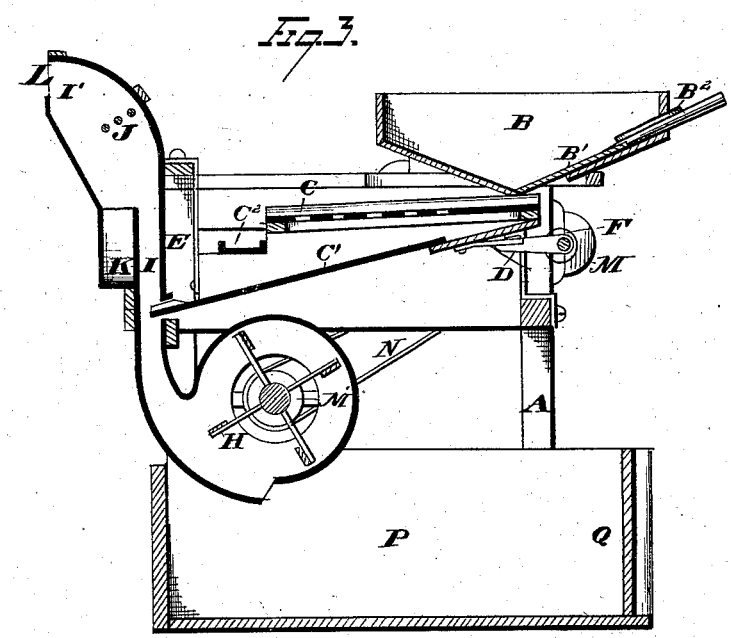

UNITED STATES PATENT OFFICE.

JOHN E. SMITH, OF SHILOH, OHIO.

IMPROVEMENT IN GRAIN-SEPARATORS.

Specification forming part of Letters Patent No. 192,941, dated July 10, 1877; application filed April 14, 1877.

*To all whom it may concern:*

Be it known that I, JOHN E. SMITH, of Shiloh, in the county of Richland and State of Ohio, have invented certain new and useful Improvements in Grain-Cleaners; and I do hereby declare the following to be a full, clear, and exact description of the invention, such as will enable others skilled in the art to which it pertains to make and use it, reference being had to the accompanying drawings, which form part of this specification.

My invention relates to new and useful improvements in grain-cleaners; and consists in the combination of devices and appliances, as hereinafter set forth and claimed.

In the drawings, Figure 1 is a side view on the side opposite the power. Fig. 2 is a view on the side where the power is applied. Fig. 3 is a longitudinal central section of the machine.

A is the frame of the machine. B is the hopper, through which the grain to be cleaned is fed. It has a movable valve, $B^1$, which may be secured at any point by a key, $B^2$, so as to leave the throat more or less open, to feed the grain in greater or less quantity.

C is the riddle. $C^1$ is the bottom of the riddle-frame, projecting through an opening into the air-flue I. $C^2$ is a trough or spout, from which chaff, straw, and coarse stuff may be carried out from the machine. The riddle-frame, bearing the riddle, riddle bottom, and spout, is given a longitudinal vibrating motion by means of an arm, D, spring supports or suspenders E, and shaft F, the shaft F being geared with the shaft G.

H is a fan. I is an air shaft or flue. It is enlarged near its top at I', and is here provided with wires or rods J, spout K, and outlet L.

M M' are cones or cone-pulleys, or other suitable speed-varying device. N is a belt. P is a box or drawer for collecting the seed or grain. Q is a tail board or door to facilitate the removal of the grain or seed.

The operation of the device is as follows: The grain to be cleaned is put into the hopper B, and is fed through the valve $B^1$ at a suitable rate, dependent on the adjustment of the said valve. It falls upon the riddle, which riddle is provided with suitable perforations, or with a screen of a suitable mesh to pass the seed or grain that is being cleaned. This riddle is caused to vibrate rapidly; the grain or seed passes through onto the bottom of the riddle-frame $C^1$, while the straw, chaff, and coarse stuff will pass as tailings from the end of the riddle C into the spout $C^2$, and from that will be shaken out at the side of the machine. The grain, with its dust, will be shaken in an interrupted manner from the bottom $C^1$ into the air-flue I. Falling vertically down through the said air-flue, it is obliged to fall through the upward current of air from the fan H. This current of air is properly regulated to permit the seed to drop down through it into the box below, while the dust and shrunken grains, chaff, cockle, and other impurities are driven upward by the blast, until the blast reaches the enlarged space I' at the top of the air-flue. Here the current of air is dispersed by the wires or rods J, and the heavier ingredients, such as bad kernels, cockle, decayed grains, &c., will drop in the spout K, and may be passed off into a bag or receptacle, to be used for chicken-feed, &c., but the dust will be passed out through the opening L.

It is apparent that for wheat and other large grains the shaker or riddle should vibrate more slowly, while the fan should be driven at a high speed; but for clover-seed the riddle should be made to vibrate more rapidly, while the fan should be driven at a less speed, because a high speed would drive out the clover-seed with the blast.

If, however, timothy or other light seeds are to be cleaned, the riddle should shake rapidly, while a very slow motion or speed should be given to the fan.

To effect this relative regulation of the motion of the riddle and fan, I employ the compensating-feed M M'. This feed operates in the usual way—that is, when the belt is on the greatest diameter of the feeding device M it is on the least diameter of the feeding device M', and vice versa.

There may be any desired number of changes or steps on the pulleys M M'. Three are shown in the drawings.

It will be observed that in the device shown the pulley M is upon that shaft which directly operates or gives motion to the riddle, and that the pulley M' is on the fan-shaft, so that, no matter what speed is given to the riddle, a corresponding relative speed must be given to the fan.

What I claim is—

In a grain-clearing machine, the combination, with longitudinally-vibrating riddle and delivery-bottom, of a fan and air shaft, the parts arranged substantially as described, whereby the vibrating delivery-plate enters the air-shaft and delivers the grain in an intermittent and variable manner for the more thorough action of the blast thereon, substantially as described.

In testimony whereof I have signed my name to this specification in the presence of two subscribing witnesses.

JOHN E. SMITH.

Witnesses:
 FRANCIS TOUMEY,
 W. E. DONNELLY.